(12) United States Patent
Potter

(10) Patent No.: US 6,764,438 B2
(45) Date of Patent: *Jul. 20, 2004

(54) COVER ATTACHMENT APPARATUS

(75) Inventor: Raymond Gary Potter, Southbury, CT (US)

(73) Assignee: Kendro Laboratory Products, LP, Newtown, CT (US)

( * ) Notice: Subject to any disclaimer, the term of this patent is extended or adjusted under 35 U.S.C. 154(b) by 35 days.

This patent is subject to a terminal disclaimer.

(21) Appl. No.: 10/176,689

(22) Filed: Jun. 24, 2002

(65) Prior Publication Data

US 2003/0199381 A1 Oct. 23, 2003

Related U.S. Application Data

(63) Continuation-in-part of application No. 10/126,785, filed on Apr. 22, 2002, and a continuation-in-part of application No. 10/126,876, filed on Apr. 22, 2002.

(51) Int. Cl.[7] .............................. B04B 7/06; B04B 5/02
(52) U.S. Cl. ........................................... 494/12; 494/16
(58) Field of Search .............................. 494/12, 16, 20, 494/33, 64, 84, 85; 210/232

(56) References Cited

U.S. PATENT DOCUMENTS

| 2,865,662 | A | * | 12/1958 | Nurmse |
| 3,819,111 | A | * | 6/1974 | Romanauskas et al. |
| 3,843,045 | A | * | 10/1974 | Schmidt et al. |
| 3,961,745 | A | * | 6/1976 | Wright |
| 4,010,890 | A | * | 3/1977 | Wright |
| 4,344,563 | A | * | 8/1982 | Romanauskas |
| 4,360,151 | A | * | 11/1982 | Cowell et al. |
| 4,412,830 | A | * | 11/1983 | Strain et al. |
| 4,435,169 | A | * | 3/1984 | Romanauskas |
| 4,753,631 | A | * | 6/1988 | Romanauskas |
| 4,850,951 | A | * | 7/1989 | Cheng et al. |
| 5,344,380 | A | * | 9/1994 | Chern et al. |
| 5,512,030 | A | * | 4/1996 | Barkus |
| 5,558,616 | A | * | 9/1996 | Barkus et al. |
| 5,681,257 | A | * | 10/1997 | Letourneur |
| 5,897,482 | A | * | 4/1999 | Lowe |
| 6,063,018 | A | * | 5/2000 | Letourneur |
| 6,149,570 | A | * | 11/2000 | Lowe et al. |
| 6,665,924 | B2 | * | 12/2003 | Schutz .................. 494/16 |
| 2003/0144124 | A1 | * | 7/2003 | Schutz |
| 2003/0199380 | A1 | * | 10/2003 | Potter .................. 494/12 |
| 2003/0199381 | A1 | * | 10/2003 | Potter .................. 494/12 |
| 2004/0018928 | A1 | * | 1/2004 | Schutz et al. .......... 494/12 |

FOREIGN PATENT DOCUMENTS

| DE | 3334655 A1 | * | 4/1985 |
| DE | 3805894 C1 | * | 3/1989 |
| DE | 3805896 C1 | * | 3/1989 |
| JP | 58-6257 | * | 1/1983 |
| JP | 7-284695 | * | 10/1995 |
| JP | 7-328486 | * | 12/1995 |

* cited by examiner

Primary Examiner—Charles E. Cooley
(74) Attorney, Agent, or Firm—Baker & Hostetler LLP

(57) ABSTRACT

A rotor cover attach and release apparatus for use with a centrifuge. The apparatus includes a knob, a cover and housing that are both affixed to the knob. The apparatus also includes an adapter having detents pitched at an angle, that is connected to the housing along with a plunger that is disposed within the knob and housing. In addition, the apparatus has a first moveable element that is retained within a passage located on the housing and a biasing element located within the housing. The apparatus additionally includes a plurality of sealing elements.

28 Claims, 8 Drawing Sheets

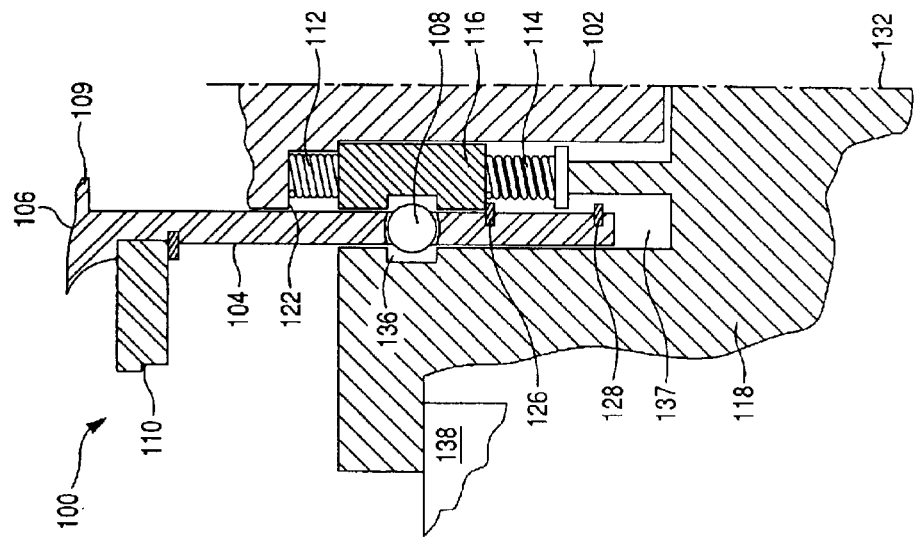
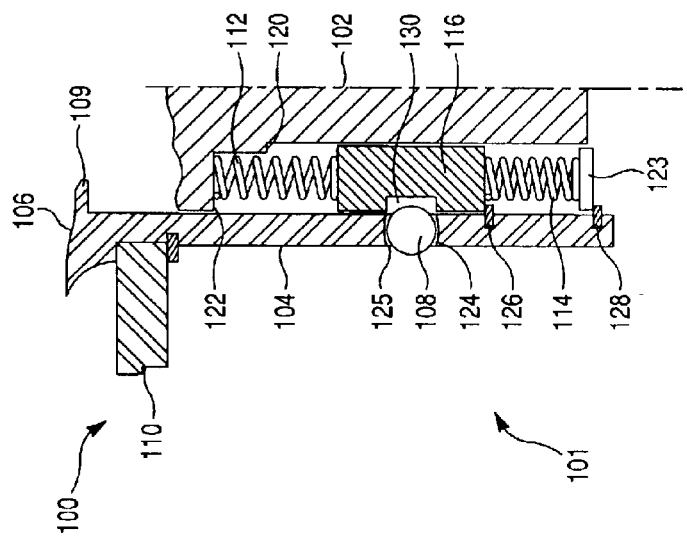

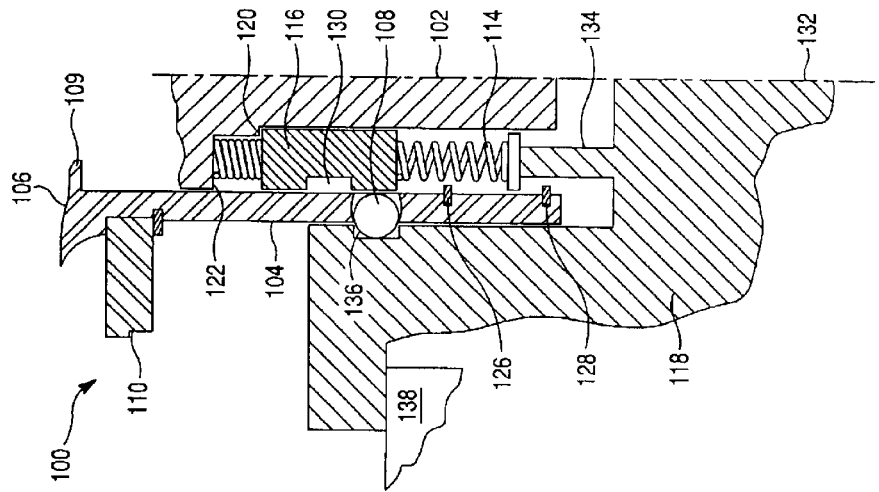
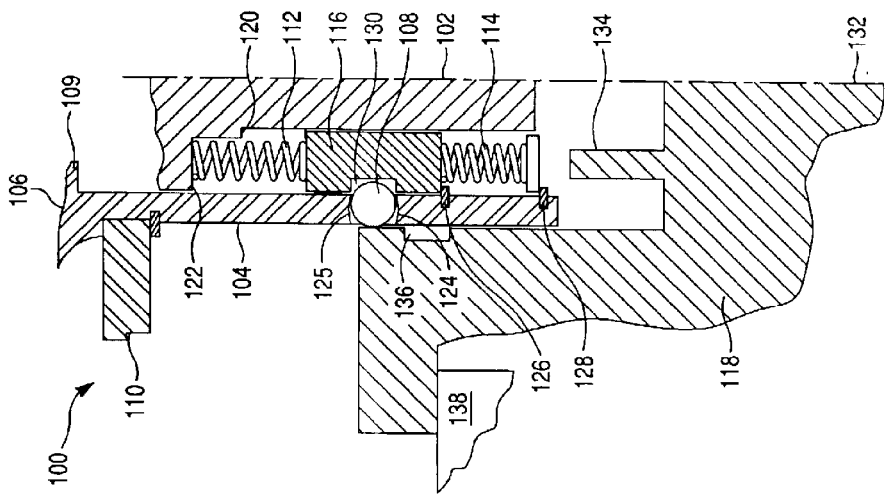

US 6,764,438 B2

COVER ATTACHMENT APPARATUS

PRIORITY

This application is a continuation-in-part, and claims the benefit of, U.S. patent application Ser. Nos. 10/126,785 and 10/126,876, each filed Apr. 22, 2002, both entitled COVER ATTACHMENT METHOD AND APPARATUS the disclosures of which are incorporated herein by reference.

FIELD OF THE INVENTION

The present invention relates to a centrifuge rotor cover assembly. More particularly, the present invention relates to a method and apparatus for attaching a cover to a centrifuge assembly.

BACKGROUND OF THE INVENTION

Centrifuges typically include a housing with a centrifuge chamber, a rotor and drive spindle that supports samples to be centrifuged, a rotor cover and a chamber door. The centrifuge chamber within which the rotor rotates is covered by the chamber door during centrifugation to protect the centrifuge operator from the spinning parts in the chamber. The chamber door also provides containment should material be projected from the rotor during rotor rotation. The rotor cover encloses the samples inside the rotor and provides an aerodynamic smooth surface to reduce air friction during operation. The rotor cover is moveable between an open and closed position. The open position accommodates access to the rotor and while in the closed position the cover encases the rotor.

During normal centrifuge operation, a liquid sample is disposed and sealed within a receptacle, usually a centrifuge sample tube, and the tube is placed within holes located on the rotor. Thereafter, the rotor cover is placed in the closed position, covering the rotor and readying the centrifuge for operation. Occasionally the centrifuge tubes may leak. This leakage can result from improper sealing of the tube, using a tube not rated for the rotor operating speed, and/or using a tube composed from material that is chemically incompatible with the sample. As a result of the aforementioned leakage, the centrifuge components may become contaminated with the samples.

In existing centrifuges, the rotor cover is designed as a separate piece or unit from the rotor and requires manual attachment and detachment for each use. One current method for attachment includes utilizing a captive nut on the rotor cover that is screwed onto a threaded post located on the center of the drive spindle of the rotor. Another current method includes utilizing clamping studs, each having threaded members, wherein the studs are inserted into receiving portions on the rotor and drive spindle and rotated several times to secure the cover to the rotor and the rotor to the drive spindle.

Current rotors have threaded clamping studs; one is used to attach the cover to the rotor and the other is used to attach the rotor to the drive spindle. These studs are oriented in series such that the rotor to drive spindle clamping stud must be disengaged first and then the cover to rotor clamping stud must be disengaged. The cover can then be removed to gain sample access. A problem that sometimes occurs in the operation of these covers is that they are time consuming to operate because many employ multiple threaded parts that each are required to be rotated multiple times to attach the cover to the rotor and the rotor to the drive spindle. Each attachment piece must be manipulated by the centrifuge operator in order to ensure the cover is securely attached to the rotor prior to centrifuge operation and subsequently disengaged after centrifuge use, preventing the centrifuge operator from gaining access to his or her samples quickly and efficiently.

In view of the foregoing, it is desirable to provide a rotor cover for effectuating quick, efficient access to the rotor of a centrifuge. It is also desirable to provide secure attachment and sealing of a rotor cover and detachment of a centrifuge rotor cover, employing a minimum number of steps and components.

SUMMARY OF THE INVENTION

The foregoing needs are met, at least in part, by the present invention where, in one embodiment, an attachment and release apparatus for use with a centrifuge rotor cover is provided having a housing with a first passage, and a plunger having an annular groove that is slidably disposed within the housing. A first biasing element is disposed within the housing. The apparatus also has an adapter having a first detent, that is removeably connected to the housing. In addition, a first moveable element is disposed within the first passage of the housing, and it is moveable between an attached position and a release position. The first moveable element is in the attached position when it is at least partially in the first detent of the adapter and contacts the plunger.

In accordance with another embodiment of the present invention, an attachment and release apparatus for use with a centrifuge rotor cover is provided having a housing wherein the housing has a first passage and a retaining ring and a cover disposed around the housing. The apparatus additionally has an adapter that is removeably connected to the housing wherein the adapter has a first detent along with a receiver portion. The apparatus further includes a plunger having a first and second contact surface that is slidably disposed within the housing. In addition, the apparatus also includes a slider member disposed around the plunger that slidably engages both the plunger and the housing. The slider member has an annular groove. The apparatus also includes a first biasing member located between the slider and the plunger and a first moveable element. The first moveable element is disposed within the first passage of the housing and it is moveable between an attached position and a released position. The first biasing member exerts a force in a first direction, displacing the slider member in the first direction and aligning the first passage with the slider annular groove. The first moveable element moves between the first passage and the slider annular groove, when the first moveable element is in the released position.

In yet another embodiment of the present invention, an attachment and release apparatus for use with a centrifuge rotor cover is provided having a housing with a first passage, and a plunger having an annular groove and a longitudinal axis that is slidably disposed within the housing. A first biasing element is disposed within the housing. The apparatus also has an adapter having a first detent, that is removeably connected to the housing. In addition, a first moveable element is disposed within the first passage of the housing, and it is moveable between an attached position and a release position. The first moveable element is in the attached position when is within the first detent of the adapter and contacts the plunger. The apparatus also includes a first sealing element that provides a seal between the cover and rotor.

In accordance with yet a further embodiment of the present invention, an attachment and release apparatus for use with a centrifuge rotor cover is provided having a housing with a passage and a cover. It also includes a plunger having an annular groove and a longitudinal axis that is slidably disposed within the housing. A first biasing element is disposed within the housing. The apparatus also has an adapter having a detent pitched at an angle relative to the longitudinal axis, that is removeably connected to the housing. In addition, a moveable element is disposed within the passage of the housing, and it is moveable between an attached position and a release position. The moveable element is in the attached position when is at least partially in the detent of the adapter and contacts the plunger.

In accordance with yet another embodiment of the invention, a method is provided for attaching and subsequently releasing a rotor cover of a centrifuge, comprising the steps of: providing a rotor cover attachment and release apparatus having a knob with a bore extending therethrough, a cover positioned below the knob, a housing connected to the knob, a plunger disposed within the knob and housing wherein the housing has a first passage, and an adapter removeably connected to the housing, wherein the adapter has a first detent and a threaded member at its distal end; and actuating the plunger in a first direction, thereby displacing the first moveable element to contact both the plunger and the detent attaching the rotor cover to the rotor.

In yet another embodiment of the present invention, method is provided for attaching and subsequently releasing a rotor cover of a centrifuge, comprising the steps of: providing a rotor cover attachment and release apparatus having a knob with a bore extending therethrough, a cover positioned below the knob, a housing having a passage connected to the knob, an adapter having a detent, and a receiver portion connected to the housing, a plunger having a first and second contact surface slidably disposed within the bore of the knob and within the housing, a slider member disposed around the plunger that slidably engages the housing and the plunger, a first biasing member, a second biasing member, and a moveable element retained within the passage of the housing; and exerting a force in a first direction, displacing the slider member against the retaining ring, thereby displacing the moveable element between the housing and the slider member.

In accordance with another embodiment of the present invention, a method for sealing a cover to a rotor is provided, comprising: biasing a plunger having an annular groove and a longitudinal axis and disposed within a housing in a first direction; actuating the plunger in an opposite, second direction; displacing a moveable element to at partially enter the annular groove of the plunger; inserting the housing into an adapter having a detent pitched at an angle relative to the longitudinal axis; biasing the plunger in the first direction, thereby displacing the moveable element to contact the plunger and at least partially enter the detent, attaching the cover to the rotor; and rotating the housing in a third direction to urge the cover assembly to the rotor.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3 is a cross-sectional view of a rotor cover attach and release apparatus in the released position in accordance with another embodiment of the present invention.

FIG. 4 is a cross-sectional view of the apparatus in FIG. 3 prior to attachment.

FIG. 5 is a cross-sectional view of the apparatus in FIG. 4 in the attached position.

FIG. 6 is a cross-sectional view of the apparatus in FIG. 5 in the released position.

DETAILED DESCRIPTION OF PREFERRED EMBODIMENTS OF THE INVENTION

The present invention provides an apparatus for attaching and releasing a rotor cover to rotor of a centrifuge. The apparatus is preferably used to securely attach a rotor cover to a centrifuge rotor, preventing the likelihood of the rotor cover erroneously disconnecting during operation. The apparatus additionally provides an attachment mechanism that may be disengaged quickly and easily, enabling the centrifuge operator to access the rotor and the samples contained thereon easily. In the embodiments depicted, the attach and release apparatuses are utilized in combination with a laboratory centrifuge. It should be understood, however, that the present invention is not limited in its application to laboratory centrifuges, but, for example, can be used with other devices having rotating components.

Figure 1:
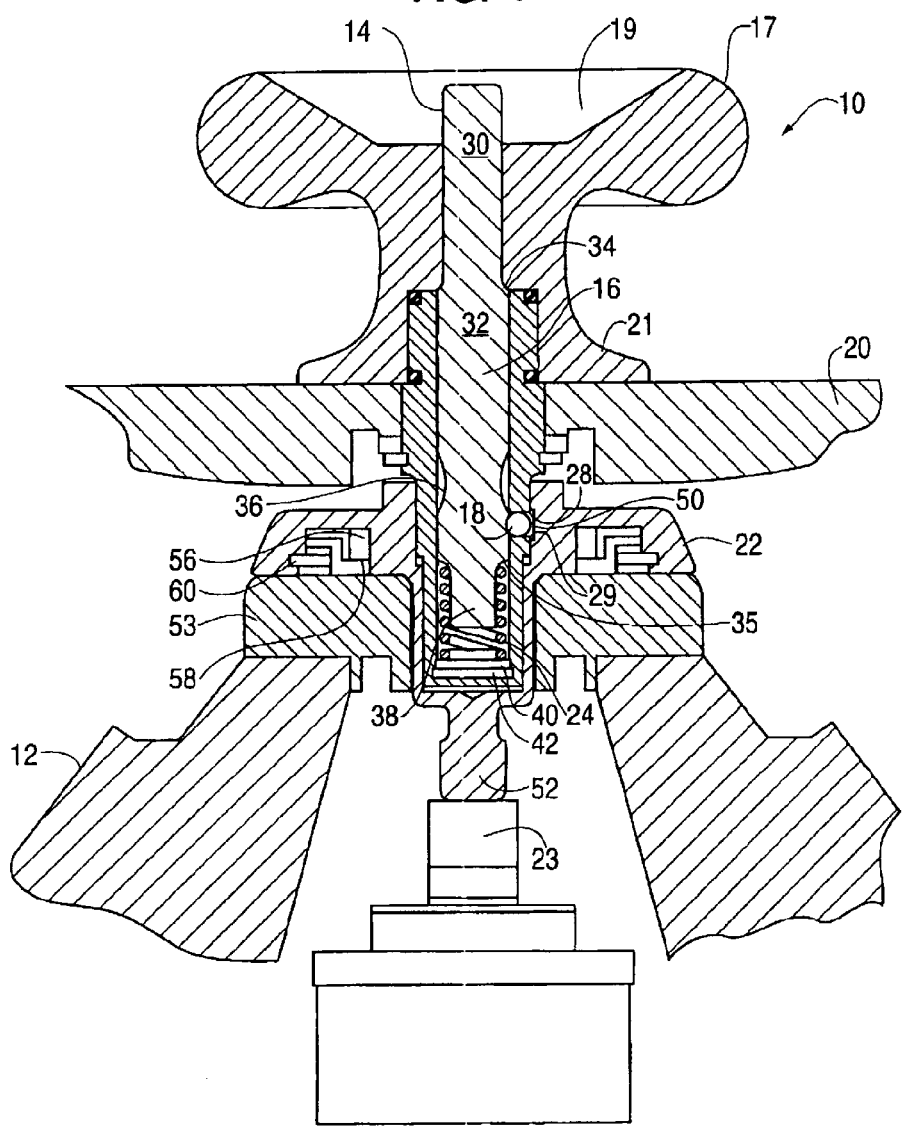
FIG. 1 is a cross-sectional view of a rotor cover attach and release apparatus in the attached position in accordance with an embodiment of the present invention.
Figure 2:
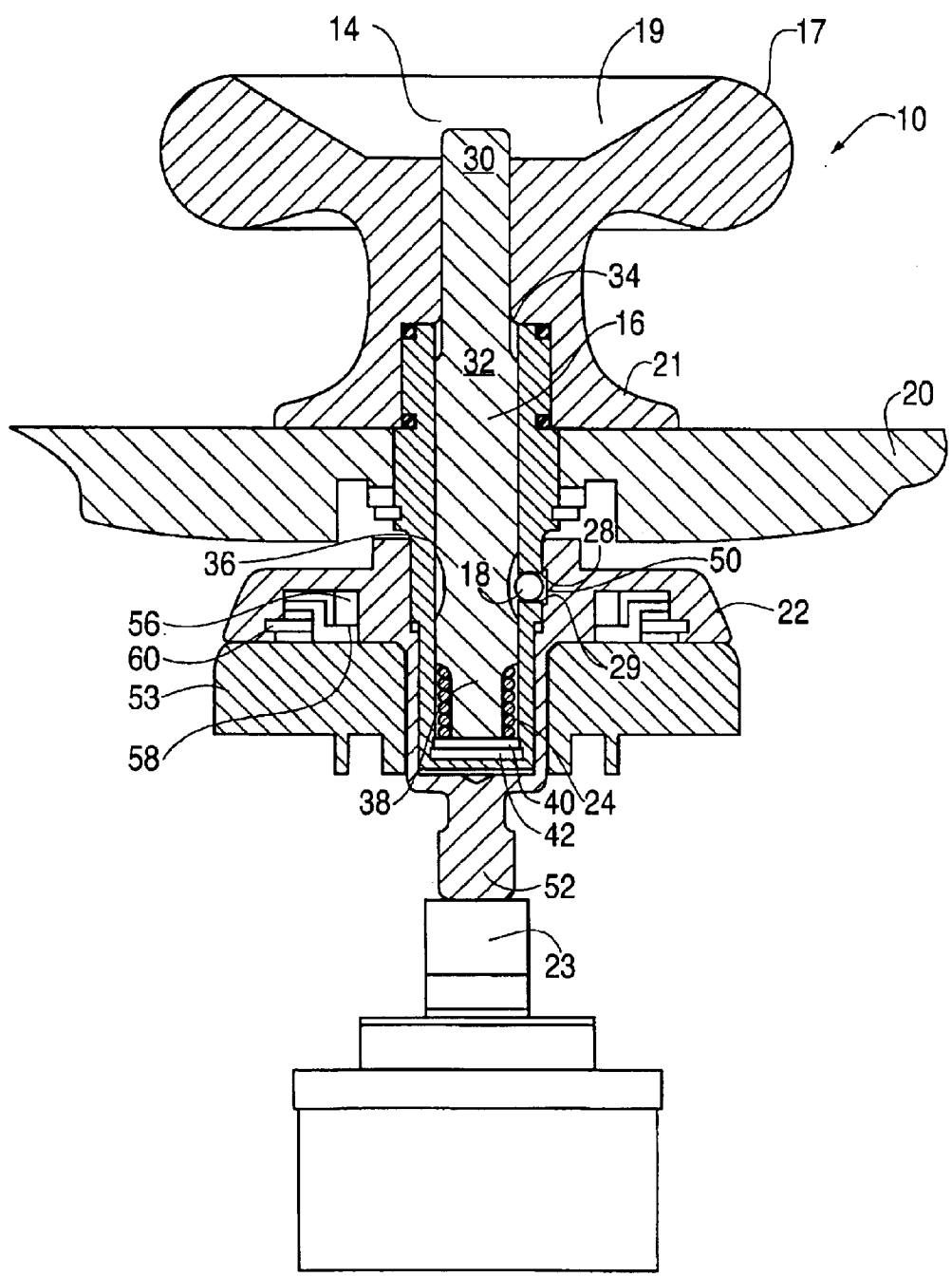
FIG. 2 is a cross-sectional view of the apparatus of FIG. 1 in the released position.

Referring now to the figures wherein like reference numerals indicate like elements, FIGS. 1–6 illustrate presently preferred embodiments of a rotor cover attach and release apparatus. FIGS. 1 and 2 show a cross-sectional view of a rotor cover attach and release apparatus 10, in accordance with an embodiment of the invention, attached to a rotor 12. Whereas FIG. 1 depicts the apparatus 10 in an attached position, FIG. 2 depicts the apparatus 10 in a released position.

As shown in FIGS. 1 and 2, the apparatus 10 includes a plunger 14 disposed within a support member 16 that is attached to a knob 17 and contains three moveable elements 18, and a cover 20 disposed around the support member 16 and plunger 14. The apparatus further includes an adapter 22 that attaches to the drive spindle 23 of a centrifuge and a biasing element 24.

As depicted, the knob 17 has an upper, convex portion 19 and a lower, flange shaped portion 21. The knob 17 is disposed around portions of the plunger 14 and is attached to the support member 16. The knob has a bore extending from the upper portion to the lower portion. The bore includes first section and second section within which portions of both the plunger 17 and the support member 16 are disposed.

As previously described, the support member 16 is attached to the knob 17. The aforementioned attachment is preferably by friction fit. Alternatively, the support member 16 may be integral with the knob 17 or may be attached to the by any suitable fastener such as a weld and/or a screw.

The support member 16 is a cylindrical component having an upper end and a lower end with a bore 26 extending therethrough. The support member 16 slidably engages the adapter 22 when the apparatus 10 is in the attachment position as depicted in FIG. 1. The support member 16 additionally has multiple receptacles or passages 28 for retaining the moveable elements 18.

The moveable elements 18 are spherical or circular in shape, such as attachment balls, and function to attach the support member 16 to the adapter 22 when the apparatus 10 is in the attachment position as illustrated in FIG. 1. In the embodiment depicted in FIG. 1, three attachment balls 18 are utilized to attach the support member to the adapter 22 (only one is illustrated), however more or less may be employed, depending upon the application. As the name suggests, the attachment balls 18 are solid spherical components having a diameter, but can be any shape as long as they function to secure the support member 16 to the adapter 22.

The passages 28 (only one is illustrated) are disposed at locations along the circumference of the support member 16 and are spaced equidistantly from one another, preferably 120 degrees apart. This spacing can vary depending upon the number of attachment balls employed. As depicted in FIGS. 1 and 2, the passages 28 are preferably bores that penetrate and pierce the width of the support member 16 wall, enabling the moveable elements 18 to engage both the plunger 14 and the adapter 22. The passages 28 have an open concavity 29 at one end, that has an inner diameter that is less than the outer diameter of the attachment balls 18, limiting the balls 18 axial outward movement away from the plunger 14. Preferably, the inner diameter of the open concavity 29 and the outer diameter of the attachment balls 18 is such that the passages prevent the balls 18 from completely exiting the support member 16 when the support member 16 is removed from the adapter 22. In addition, the passages 28 allow for radial movement of the balls 18 between the plunger 14 and the adapter 22.

As depicted in FIG. 1, the plunger 14 is disposed within the bores of both the knob 17 and the support member 16 respectively, and moves the attachment balls 18 substantially radially through the support member 16 when it is actuated. It extends from the convex, upper portion of the knob 19, through the support member 16. The plunger 14 slidably engages both the knob 17 and the support member 16. The plunger 17 includes three regions having three diameters. The first region 30, has a first diameter and slidably engages the first section of the bore of the knob 17. The second region 32, has a second diameter preferably greater than the diameter of the first region, and combines with first region 30 to form a shoulder 34. The shoulder 34 contacts the knob 17 and limits the upward translation of the plunger 14. The second region 32 slidably engages the support member 16. As illustrated in FIGS. 1 and 2, the second region 32 of the plunger 14 has an annular groove 36 that extends along the entire circumference of the plunger 17. Alternatively, the annular groove 36 may be cirumferentially segmented. The third region 38 has a third diameter less than the second diameter forming a second shoulder 35. The third region 38 is additionally configured and arranged to receive the biasing element 24.

While the illustrated embodiments depict a plunger 14 having multiple regions with varying diameters, alternative embodiments and/or modifications employing a plunger having a single diameter also fall within the scope of the invention. For example, apparatuses employed on centrifuges where an upward, translational force is not exerted on the plunger, can be configured utilizing a plunger having a single, constant diameter. Though embodiments utilizing a plunger having a single diameter are described, the utilization of a plunger having multiple diameters is preferred.

The biasing element 24 is preferably a compression spring and encircles the entire circumference of the third region 38 of the plunger 14 and contacts the lower second region 32 of the plunger 14. The compression spring 24 is retained between a the second shoulder 35 of the plunger 14 and a washer 40 and retaining ring 42. The compression spring 24 functions to exert an axial force on the plunger 14, displacing the plunger upward until it contacts the shoulder 34.

As depicted in FIGS. 1 and 2, the adapter 22 is configured to receive the support member 16 and includes an adapter groove and/or detent 50 along with a threaded member 52. The adapter groove and/or detent 50 may be continuous or circularly segmented. The adapter 22 rests on the rotor attachment ring 53 and functions to attach the rotor 12 to the drive spindle 23 by screw attachment.

The adapter 22 also includes an adapter biasing member 56, an insert washer 58, and an insert retaining ring 60. The biasing member is preferably a spring and provides a tensioning force on the threaded member 52. The aforementioned tensioning force functions to reduce the movement between the thread member 52 of the adapter 22 and threads of the drive spindle, preventing the likelihood of the adapter detaching during centrifuge operation.

In the embodiments depicted, the adapter 22 the adapter spring 56, and insert washer 58 are preferably coated with a low friction, high wear resistant coating such as a dry film coating. This coating prevents friction and wear during rotor to drive spindle attachment and release operation, and significantly increases the life of the components, for example a dry film lubricant or grease. However, alternative embodiments and/or modifications not employing a low friction, high wear resistance coating also fall within the scope of the invention.

Embodiments utilizing a continuous adapter groove and/or detent require the adapter 22 to be threaded into the drive spindle of the rotor by hand or by utilizing a separate tool. Conversely, embodiments employing a circularly, segmented adapter groove and/or detent enable the apparatus to function as a tool to thread the adapter into the drive spindle. In these embodiments, the support member 16 is inserted into the adapter 22 and the moveable elements engage the adapter grooves and/or dentents. The knob 17 and support member 16 can then be utilized as a tool to thread the adapter 22 into the drive spindle 23.

The above described components of that attachment apparatus 10, specifically the plunger 14, the support member 16, the knob 17, the attachment balls 18, the adapter 22, and the compression spring 24, are preferably provided by any suitable materials that share similar thermal growth coefficients, for example, stainless steel.

FIGS. 1 and 2 together illustrate operation of the rotor cover attachment apparatus 10. As shown in FIG. 1, when the centrifuge is in use and the rotor is rotating, the apparatus 10 and its components are in attached position. By attached position, it is understood that support member 16 with the knob 17, plunger 14, and cover 20 connected thereto as previously described, is inserted into the adapter 22 and the moveable elements 18 are engaging the adapter groove and/or detent 50. In this position, the compression spring 24 exerts an upward, axial force on the plunger 14, displacing the plunger upwards to a first position where the second plunger region 32 contacts the shoulder 34 of the knob 17. As a result of the aforementioned translational movement of the plunger 14, the attachment balls 18 are displaced substantially radially outward from the plunger 14, such that they engage the adapter groove and/or detent 50, thereby attaching the cover 20 to rotor 12. In this first position, the plunger 14 functions to hold the attachment balls 18 in the adapter groove and/or detent 50, preventing the likelihood of the cover 20 releasing during centrifuge operation.

As shown in FIG. 2, when the centrifuge is not being operated, the attachment balls are radially displaced inward towards the plunger 17 in the released position. By released position it is understood that the centrifuge is not in use and the cover 20 is either being removed from the rotor or about to be attached to rotor and the plunger 14 has been depressed to a second position. In this position, the plunger 14 is translated downward such that the plunger annular groove 36 is aligned with the respective adapter grooves and/or detents 50, permitting the attachment balls 18 to move inward. This inward displacement by the attachment balls 18 allows for the support member 16 to be either inserted or removed from the adapter 22.

Referring now to FIGS. 3–6, a cross-sectional view of an attachment and release apparatus 100, is shown in accordance with an alternative embodiment of the present invention. Whereas FIGS. 3, 4, and 6 depict the apparatus 100 in the released position, FIG. 5 depicts the apparatus 100 in attached position.

As shown in FIGS. 3–14 the apparatus 100 includes a plunger 102 disposed within a support member 104 that is attached to a knob 106. The support member 104 preferably contains three moveable elements 108. The apparatus further includes a cover 110 that is disposed around the support member 104 along with a upper biasing element 112, a lower biasing element 114, a slider 116, and an adapter 118.

The knob 106 has a bore extending therethrough as described in previous embodiments, and an inward protrusion 109 that extends into the bore. The inward protrusion 109 functions to act as an upper stop to the plunger 102, limiting the upward, translational movement of the plunger 102.

The plunger 102 is disposed within the support member 104 and slidably engages the support member 104. The plunger 102 has a first contact surface 120 and a second contact surface 122. The first contact surface 120 provides an upper stop for the slider 116.

The combination of the plunger 102, the support member 104, the knob 106, the moveable elements 108, the biasing members 112 and 114, and the slider 116 form a "knob assembly 101" that removeably attaches to the adapter 118.

The support member 104 encircles the entire circumference of the plunger 102 and slidably engages both the plunger 102 and the slider 116. The support member 104 is affixed to the knob 106 preferably by friction fit. It has an upper and lower end with a bore extending therethrough. The support member preferably includes three passages 124 located along the circumference of the support member 104 that retain the moveable elements 108. The passages 124 are preferably equally spaced from one another, each located approximately 120 degrees apart. The support member 104 further includes a first retaining ring 126 and a second retaining ring 128. The first retaining ring functions to limit the downward, translational movement of the slider 116. The second retaining ring function to support the lower biasing element 114.

The moveable elements 108 are preferably spherical or circular in shape, such as attachment balls, and function to attach the support member 104 to the adapter 118 when the apparatus 100 is in the attached position, as illustrated in FIG. 5. In the embodiments depicted in FIGS. 3–14 the three attachment balls 108 are utilized to attach the support member 104 to the adapter 118. More or less attachment balls 108 may be employed, depending upon the application. The attachment balls 108 are preferably spherical shaped, i.e. solid ball components having a diameter, but can be any shape as long as shape they function to secure the support member 104 to the adapter 118.

As depicted in FIGS. 3–14 the passages 124 are preferably bores that penetrate and pierce the width of the support member 104 wall, allowing the attachment balls 108 to engage both the adapter 118 and the slider 116. The passages 124 have an open concavity 125 at one end having an inner diameter less than the outer diameter of the attachment balls 108. These concavities 125 function to limited the attachment balls' radial movement outward away from the plunger 14.

The slider 116 encircles the entire plunger 102 and radially moves the attachment balls 108 through the support member 104. The slider 116 moves axially along the plunger 102 by reaction to the upper biasing element 112 and the lower biasing element 114 and by the plunger 102. The upper biasing element 112 is located between the top of the slider 116 and the second contact surface 122 of the plunger 102, and the lower biasing element 114, is located between the bottom of the slider 116 and a washer 123. The washer 123 encircles the plunger 102 and "floats" within the support member 104. In the orientation previously described and depicted in FIG. 3, the upper biasing member 112 exerts a downward force on the slider 116 when the apparatus 100 is in the released position. This downward force displaces slider member 116 such that it is contacts or abuts the retaining 126 when the apparatus is in the released position, as in FIG. 3.

The biasing elements, 112 and 114, are preferably tension springs and/or compression springs. In the embodiment depicted, the lower spring 114 preferably has a higher stiffness than the upper spring 112. However, alternative embodiments may employ springs having similar degrees of stiffness.

Figure 14:
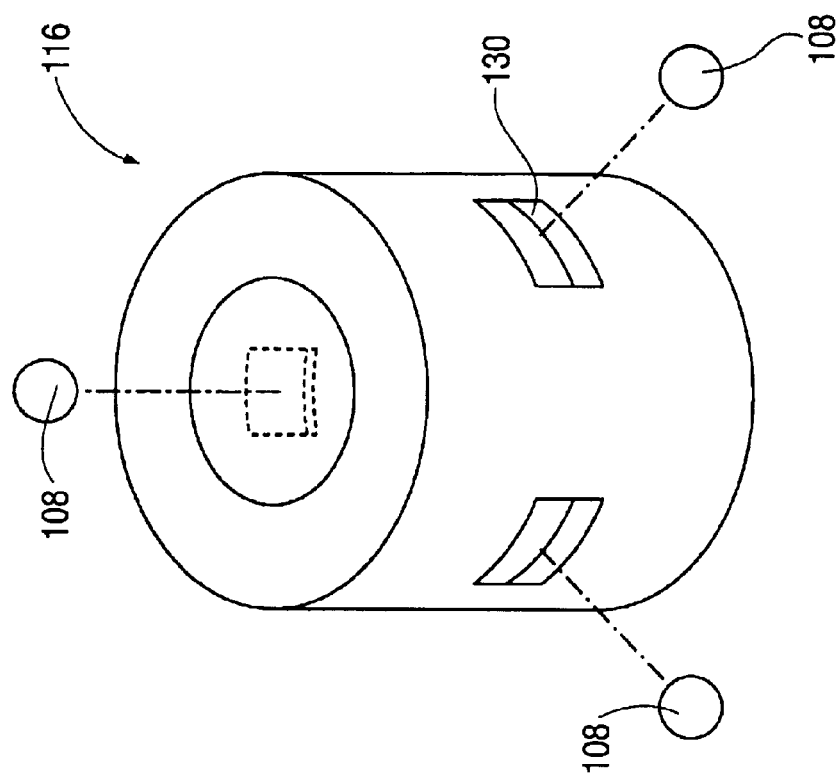
FIG. 14 is a schematic view of a slider in combination with moveable elements in accordance with another embodiment of the present invention.
Figure 13:
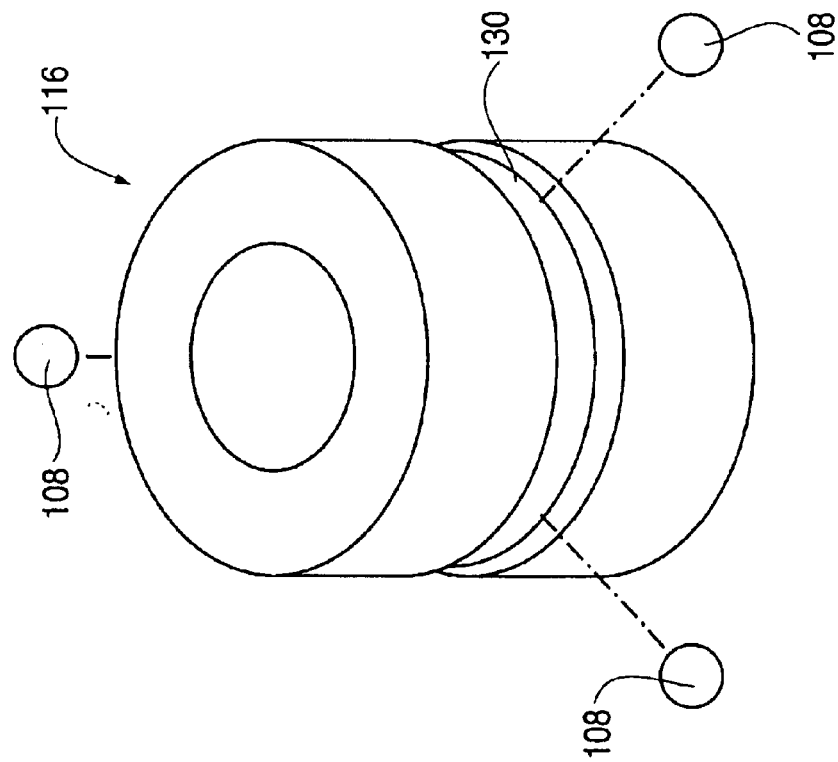
FIG. 13 is a schematic view of a slider in combination with moveable elements in accordance with an embodiment of the present invention.

As schematically illustrated in FIGS. 13 and 14, the slider 116 additionally has an annular groove 130 for receiving and engaging a portion of the attachment balls 108 when the apparatus 100 is in the released position. The groove 130 may extend along the entire circumference of the slider 116 as depicted in FIG. 13, or alternatively, the groove 130 may be circumferentially segmented as depicted in FIG. 14.

The adapter 118 is configured to receive the knob assembly 101 and includes a threaded member 132, an adapter ring 134, and an adapter groove and/or detent 136. The adapter groove and/or detent 136 may be continuous or circularly segmented. The adapter rests on the rotor attachment ring 138 and functions to attach the rotor (not shown) to the drive spindle (not pictured) by threading the threaded member 132 into the drive spindle of the centrifuge. The adapter 118 additionally has a receiver portion 137 for receiving the support member 104 when the knob assembly 101 is inserted into the adapter 118.

Embodiments utilizing a continuous adapter groove and/or detent require the adapter 118 to be threaded into the drive spindle of the rotor by hand or by utilizing a separate tool. Conversely, embodiments employing a circularly, segmented adapter groove and/or detent enable the knob assembly 101 to function as a tool to thread the adapter into the drive spindle. In these embodiments, the support member 104 is inserted into the adapter 118 and the moveable elements engage the adapter grooves and/or detents. The knob 106 and support member 104 can then be utilized as a tool to thread the adapter 118 into the drive spindle of the centrifuge.

The above described components of that attachment apparatus 100, specifically the plunger 102, the support member 104, the knob 106, the attachment balls 108, the adapter 118, and the springs 112 and 114, are preferably provided by any suitable materials that share similar thermal growth coefficients, for example, stainless steel.

FIGS. 3–6 together illustrate operation of the rotor cover attachment apparatus 100. As shown in FIGS. 3 and 4, when the centrifuge is not in use and the rotor is not rotating, the apparatus 100 is in the released position. FIG. 3 illustrates the knob assembly 101 completely removed from the adapter 118 while FIG. 4 illustrates the knob assembly 101 during the insertion procedure. By released position, it is understood that the slider 116 is in a fixed position, abutting the retaining ring 126. In this position, the upper spring 112 exerts a greater force on the slider 116 than the lower spring 114. Due to the greater force exerted by the upper spring 112, the slider 116 is held against the retaining ring 126 in a fixed position relative to the support member 104. In addition, the slider groove 130 is aligned with the passage 124 enabling the attachment balls 108 to radially move between the passage 124 and the slider groove 130.

Moving from FIG. 4 to FIG. 5, the transition of the apparatus 100 from the released position to the attached position is illustrated. As the knob assembly 101 is further inserted into the adapter 118, the attachment balls 108 near horizontal alignment with adapter groove and/or detent 136. As this occurs, the washer 123 contacts the adapter ring 134. As the adapter ring 134 contacts the washer 123, the slider 116 translates upwards compressing both the upper and lower spring 112 and 114 respectively. As the slider 116 moves upward, it pushes the moveable element 108 through the support member 104 and into the adapter groove and/or detent 136 of the adapter 118, attaching the knob assembly 101 to the adapter 118. As a result, the cover 110 securely attaches to the rotor of the centrifuge and the apparatus 100 is in the attached position.

FIG. 5 depicts the apparatus 100 in the attached position. As shown, the attachment balls 108 are engaging the adapter groove and/or detent. The slider 116 is in the upward position, close or in contact with the contact surface 120 of the plunger 102. The slider 116 is held in this position by the lower spring 114. While in this position, the slider 116 blocks the passage 124, preventing undesirable radial movement of the attachment balls 108 and thus preventing the likelihood of the apparatus 100 releasing erroneously.

As shown in FIG. 6, the apparatus 100 is released from the attached position illustrated in FIG. 5 by depressing the plunger 102. The plunger contact surface 120 contacts the slider and translates the slider 116 downward until the slider groove 130 is aligned with the passage 124. As the grooves 124 and 130 become aligned, the attachment balls 108 may return to the slider groove 130, releasing the knob assembly 101 from the adapter 118.

Referring now to FIGS. 7–10, a cross-sectional view of the attachment and release apparatus 10 depicted in FIGS. 1 and 2, is shown in accordance with an alternative embodiment of the present invention. The apparatus 10 includes sealing elements 62, 64, and 66 along with an adapter 22 having segmented adapter grooves and/or detents 68. The apparatus additionally includes passages 70, 72 and 74, which are located within the knob 14, the adapter 22, and the cover 20, respectively. The plunger 14, the housing 16, the knob 17 and the sealing elements 62 and 66 and the various contained therein combine to form a cover assembly that is inserted into the adapter 22.

Figure 7:
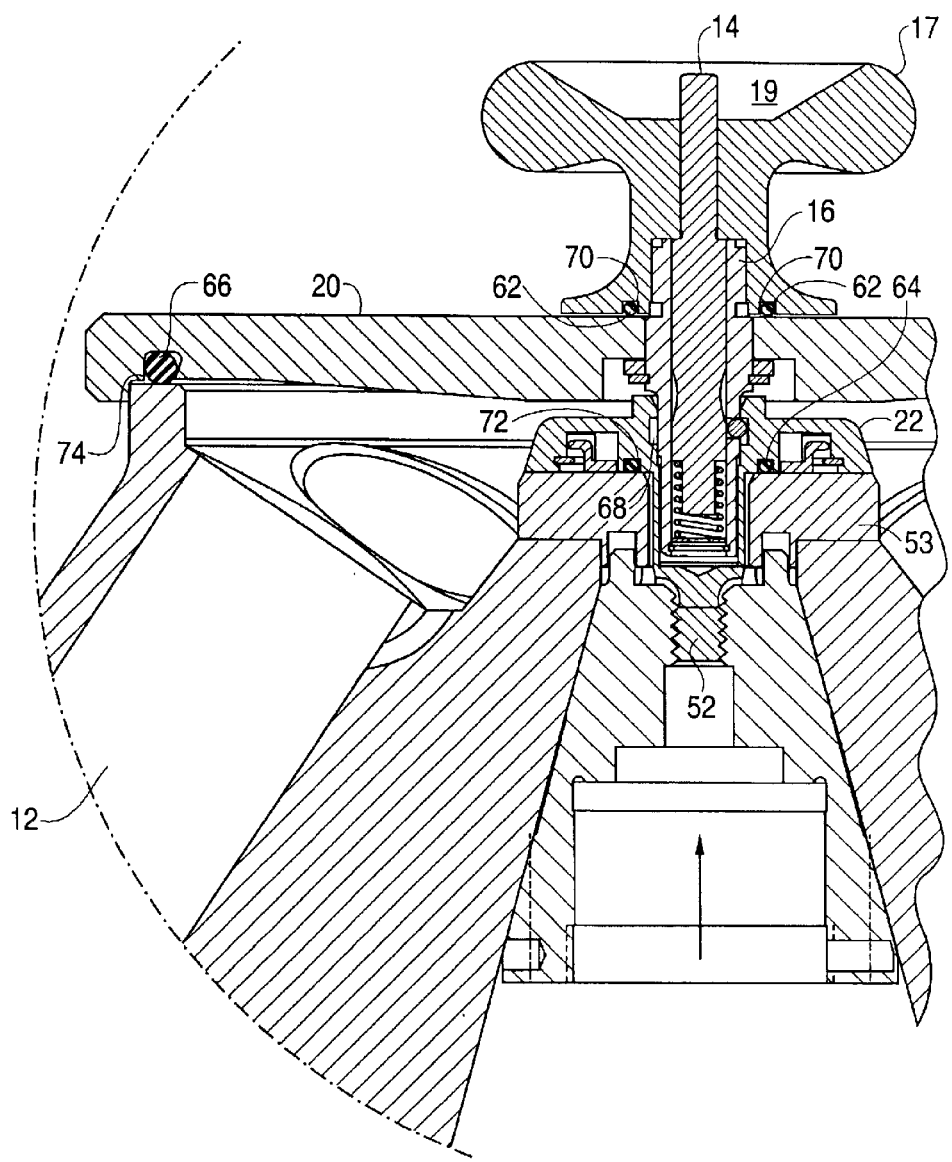
FIG. 7 is a cross-sectional view of a rotor cover attach and release apparatus in accordance with another embodiment of the present invention.

As shown in FIG. 7, sealing element 62 is preferably disposed within passage 70 of the knob 17. Sealing element 62 engages both the knob 17 and the cover 20, providing a seal between the two. Sealing element 64 is preferably disposed within passage 72 of the adapter 22. Sealing element 64 engages both the adapter 22 and the rotor attachment ring 53, providing a seal between the two. Sealing element 66 is preferably disposed within passage 74 of the cover 20. Sealing element 66 engages both the cover 20 and the rotor 12, providing a seal between the two.

The illustrated placement of the sealing elements 62, 64, 66 offers ease in manufacture of the attachment and release apparatus 10, and in addition, allows gravity to assist in keeping the sealing elements 62, 64, 66 in position. The sealing elements 62, 64, 66 are preferably O-ring type seals but other means known in the art, including graphite packing and plastic type sealing elements such as vee rings, can be used.

Figure 8:
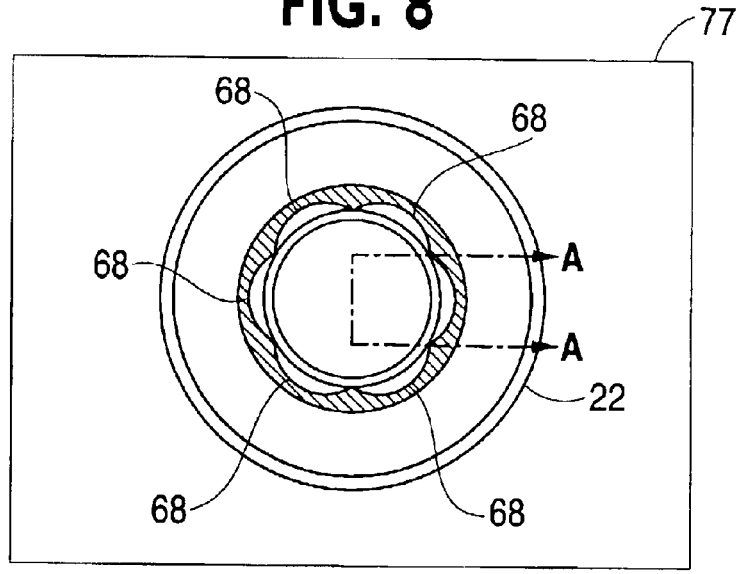
FIG. 8 is top section view through the groove and/or detent of an adapter which is employed in the embodiment depicted in FIG. 7.
Figure 9:
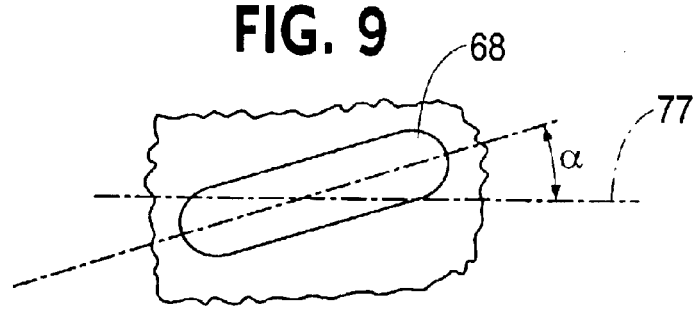
FIG. 9 is detailed side view of the adapter along line A—A of FIG. 8.
Figure 10:
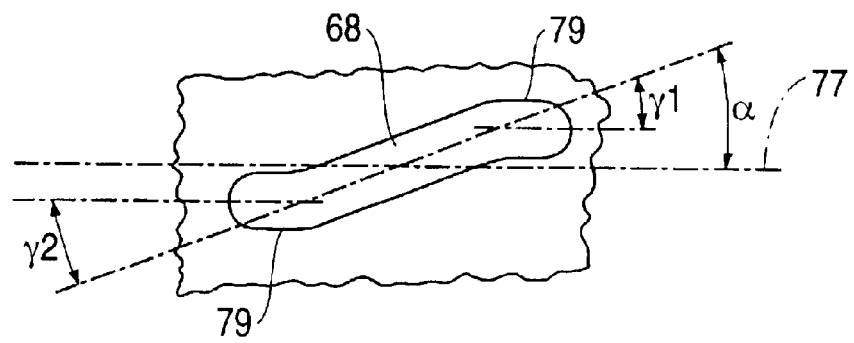
FIG. 10 is a detailed side view of the adapter along line A—A in accordance with an alternative embodiment.
Figure 12:
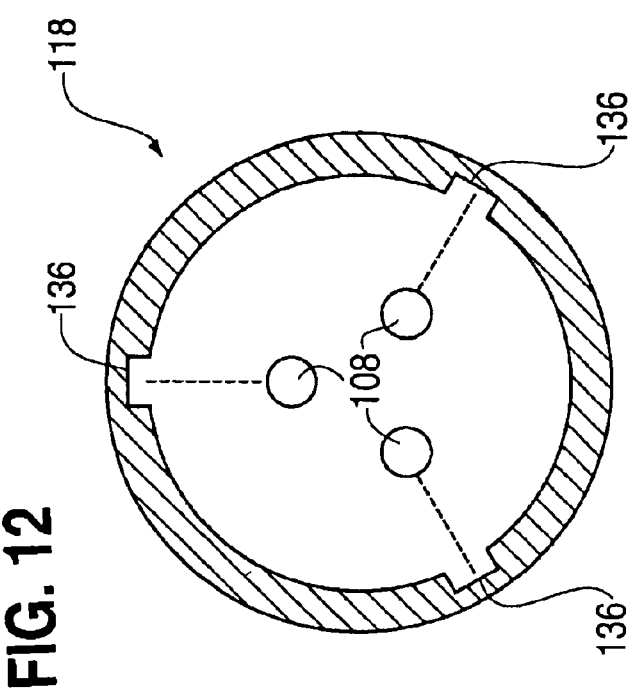
FIG. 12 is a top, sectional view of an adapter in combination with moveable elements in accordance with an embodiment of the present invention.
Figure 11:
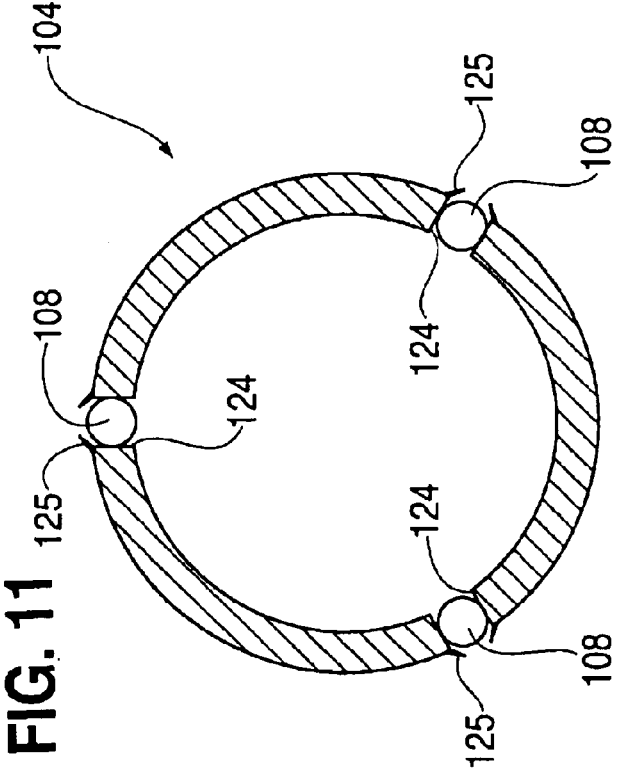
FIG. 11 is a top, sectional view of a support member in combination with moveable elements in accordance with an embodiment of the present invention.

As depicted in FIGS. 8–10, the adapter 22 has an adapter groove and/or detent 68 that is preferably circumferential segmented. The adapter groove and/or detent 68 may vary in shape and size. Preferably, this groove and/or detent 68 is either all or in part, pitched at an angle, Alpha ($\alpha$), relative to a section plane 77 at the center of the groove and/or detent 68 as depicted in FIG. 8. The section plane 77 is perpendicular to the longitudinal axes of the adapter 22 and the plunger 14, as illustrated in FIGS. 9 and 10. The angle at which the adapter groove and/or detent 68 is pitched may vary but preferably it has the same orientation, positive or negative, as the angle of the threads of the adapter 22 that provide threaded attachment of the adapter 22 to the drive spindle. The above described orientation between the groove and/or detent 68 and adapter threads prevents the likelihood of loosening and/or disconnecting the adapter 22 from the drive spindle when the support member 16 is rotated to engage the sealing elements 62, 64 and 66.

Alternatively, the adapter groove and/or detent 68 can be generally "S" shaped as illustrated in FIG. 10 with the center section of the groove and/or detent 68 pitched at an angle, Alpha (α), relative to the section plane 77 at the center of the groove and/or detent as depicted in FIG. 8. Similar to the embodiment depicted in FIG. 9, the section plane 77 is perpendicular to the longitudinal axes of the adapter 22 and the plunger 14 while the ends 79 of the groove and/or detent 68 are pitched at angles Gamma 1 (γ1) and Gamma 2 (γ2).

During operation of the attachment and release apparatus 10, the sealing elements 62 and 66 combine with the adapter groove and/or detent 68 to provide a seal between the cover 20 and the rotor 12. Meanwhile, sealing element 64 provides a seal between the adapter 22 and the rotor attachment ring 53 during operation. The sealing element 64 is activated when the adapter secures the rotor to the drive spindle. The aforementioned seal between cover 20 and the rotor is obtained by rotating the support member 16 about the longitudinal axis of the adapter 22 when the apparatus 10 is in the attached position. The rotation of the support member 16 is in the same direction as to attach the adapter via thread attachment, preventing the likelihood of compromising the connection between the adapter 22 and the drive spindle as discussed above. As previously described, by attached position, it is understood that the support housing 16 with the knob 17, plunger 14, and cover 20 connected thereto, is inserted into the adapter 22 and the moveable elements 18 are engaging the adapter groove and/or detent 68. The aforementioned rotation of the support housing 16 causes the attachment balls 18 to move within the pitched adapter groove and/or detent 68 and results in the cover and knob being drawn towards the rotor 12. This movement of the cover 20 and knob 17 causes the sealing elements 62 and 66 to engage the cover 20 and the rotor 12, respectively, providing a sealed rotor. The sealed rotor provides protection to the centrifuge operator in the event of a tube or bottle leakage that could cause the release of a hazardous substance from within the rotor.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A rotor cover attachment and release apparatus for use with a centrifuge having a rotor, a rotor attachment ring, and a cover, comprising:
    a housing having a first passage;
    a cover disposed around said housing;
    an adapter having a first detent removeably connected to said housing;
    a plunger having a longitudinal axis slidably disposed within said housing, said plunger having a groove at an axial location thereof;
    a first moveable element retained within said first passage so that said first moveable element is moveable between an attached position and a released position, wherein said moveable element at least partially enters said first detent and contacts said plunger when said first moveable element is in the attached position;
    a first biasing element disposed within said housing and contacts said plunger; and
    a first sealing element that provides a seal between said cover and the rotor.

2. The apparatus according to claim 1, wherein said first detent is pitched at an angle relative to the longitudinal axis.

3. The apparatus according to claim 2, wherein said adapter has a second detent pitched at an angle relative to the longitudinal axis.

4. The apparatus according to claim 3, wherein said housing has a second passage.

5. The apparatus according to claim 4, wherein said second passage has an open concavity at one end.

6. The apparatus according to claim 4, further comprising a second moveable element retained within said second passage so that said second moveable element is moveable between an attached position and a released position, wherein said second moveable element at least partially enters said second detent and contacts said plunger when said second moveable element is in the attached position.

7. The apparatus according to claim 6, wherein said plunger is actuated and said second moveable element at least partially enters an annular groove of said plunger when said second moveable element is in the released position.

8. The apparatus according to claim 6, wherein said second moveable element is a sphere having a diameter.

9. The apparatus according to claim 4, wherein said adapter has a third detent pitched at an angle relative to the longitudinal axis.

10. The apparatus according to claim 9, wherein said housing has a third passage.

11. The apparatus according to claim 10, wherein said third passage has an open concavity at one end.

12. The apparatus according to claim 10, further comprising a third moveable element retained within said third passage so that said third moveable element is moveable between an attached position and a released position, wherein said third moveable element at least partially enters said third detent and contacts said plunger when said third moveable element is in the attached position.

13. The apparatus according to claim 12, wherein said plunger is actuated and third moveable element at least partially enters said groove of said plunger when said third moveable element is in the released position.

14. The apparatus according to claim 12, wherein said third moveable element is sphere having a diameter.

15. The apparatus according to claim 9, wherein said third detent is generally "s" shaped.

16. The apparatus according to claim 3, wherein said second detent is generally "s" shaped.

17. The apparatus according to claim 1, wherein said groove is annular.

18. The apparatus according to claim 1, wherein said first detent is generally "s" shaped.

19. The apparatus according to claim 1, wherein said plunger is actuated and said first moveable element at least partially enters said groove of said plunger when said first moveable element is in the released position.

20. The apparatus according to claim 1, wherein said first passage has an open concavity at one end.

21. The apparatus according to claim 1, wherein said first movable element is a sphere having a diameter.

22. The apparatus according to claim 1, further comprising:
    a second biasing element disposed within said adapter; and
    a washer disposed within said adapter retaining said second biasing element between said adapter and said washer.

23. The apparatus according to claim 22, wherein said first biasing element and said second biasing element are a compression spring and/or tension spring.

24. The apparatus according to claim 1, further comprising a knob connected said housing, said knob having a bore extending therethrough, wherein said plunger is slidably disposed within said bore.

25. The apparatus according to claim 1, further comprising a second sealing element that provides a seal between said adapter and the rotor attachment ring.

26. The apparatus according to claim 25, further comprising a third sealing element provides a seal between said cover and said housing.

27. The apparatus according to claim 26, wherein said sealing elements are O-rings.

28. A rotor cover attachment and release apparatus for use with a centrifuge having a rotor, a rotor attachment ring, and a drive spindle, comprising:

a housing having a passage;

a cover disposed around said housing;

an adapter removeably connected to said housing, said adapter having a detent wherein said detent is pitched at an angle relative to the longitudinal axis;

a plunger having a longitudinal axis slidably disposed within said housing, said plunger having a groove at an axial location thereof;

a moveable element retained within said first passage so that said moveable element is moveable between an attached position and a released position, wherein said moveable element at least partially enters said detent and contacts said plunger when said moveable element is in the attached position; and a biasing element disposed within said housing and contacts said plunger.

\* \* \* \* \*